(12) United States Patent
Brueck et al.

(10) Patent No.: US 10,240,595 B2
(45) Date of Patent: Mar. 26, 2019

(54) METHOD FOR EMPTYING A DEVICE FOR PROVIDING A LIQUID ADDITIVE

(71) Applicant: CONTINENTAL AUTOMOTIVE GMBH, Hannover (DE)

(72) Inventors: Rolf Brueck, Bergisch Gladbach (DE); Jan Hodgson, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 627 days.

(21) Appl. No.: 14/650,400

(22) PCT Filed: Nov. 15, 2013

(86) PCT No.: PCT/EP2013/073974
§ 371 (c)(1),
(2) Date: Jun. 8, 2015

(87) PCT Pub. No.: WO2014/086572
PCT Pub. Date: Jun. 12, 2014

(65) Prior Publication Data
US 2015/0308427 A1 Oct. 29, 2015

(30) Foreign Application Priority Data
Dec. 7, 2012 (DE) .......... 10 2012 111 917

(51) Int. Cl.
*F04B 53/04* (2006.01)
*F04B 49/10* (2006.01)
(Continued)

(52) U.S. Cl.
CPC .......... *F04B 53/04* (2013.01); *F01N 3/208* (2013.01); *F01N 3/2066* (2013.01);
(Continued)

(58) Field of Classification Search
CPC .......... F01N 3/208; F01N 2610/01; F01N 2610/1486; F01N 2610/1433;
(Continued)

(56) References Cited

U.S. PATENT DOCUMENTS 2,765,743 A * 10/1956 Hollinshead .......... F04C 14/28
200/83 R
5,884,475 A 3/1999 Hofmann et al.
(Continued)

FOREIGN PATENT DOCUMENTS

CN 101568707 A 10/2009
DE 102004030441 A1 1/2006
(Continued)

*Primary Examiner* — Bryan Lettman
(74) *Attorney, Agent, or Firm* — Laurence A. Greenberg; Werner H. Stemer; Ralph E. Locher (57) ABSTRACT

A method for operating a device for providing a liquid additive includes feeding the liquid additive along a feeding path. The feeding path has at least one first portion in which a peristaltic pump is disposed. The pump, in particular, has a reversible feeding direction and can be damaged by deposits discharged from the liquid additive. The feeding path also has at least one second portion in which a component susceptible to freezing is disposed. At first liquid additive is fed along the feeding path of the device. Subsequently, the feeding of the liquid additive is stopped. The feeding path is then partially emptied in such a way that liquid additive remains in the at least one first portion of the feeding path while the at least one second portion is emptied. A device for providing a liquid additive is also provided.

9 Claims, 3 Drawing Sheets (51) Int. Cl.
*F01N 3/20* (2006.01)
*F04B 43/00* (2006.01)
*F04B 43/12* (2006.01)

(52) U.S. Cl.
CPC .......... *F04B 43/0081* (2013.01); *F04B 43/12* (2013.01); *F04B 49/106* (2013.01); *F01N 2610/01* (2013.01); *F01N 2610/02* (2013.01); *F01N 2610/1433* (2013.01); *F01N 2610/1486* (2013.01); *Y02T 10/24* (2013.01)

(58) Field of Classification Search
CPC .. F01N 2610/144; F01N 3/36; F04B 43/0081; F04B 43/12; F04B 49/106; F04B 2207/03; F04B 53/04; Y10T 10/24
See application file for complete search history.

(56) References Cited

U.S. PATENT DOCUMENTS

| | | | |
|---|---|---|---|
| 7,937,932 B2 | 5/2011 | Hager et al. | |
| 8,225,598 B2 | 7/2012 | Haeberer et al. | |
| 8,250,855 B2 | 8/2012 | Kleinknecht | |
| 2007/0283685 A1* | 12/2007 | Ripper | B01D 53/90 60/288 |
| 2009/0077949 A1 | 3/2009 | Kleinknecht | |
| 2009/0301064 A1* | 12/2009 | Maier | F01N 3/2066 60/286 |
| 2010/0064668 A1 | 3/2010 | Beckmann et al. | |
| 2010/0326546 A1 | 12/2010 | Haeberer et al. | |
| 2012/0181261 A1 | 7/2012 | Brück et al. | |
| 2013/0000760 A1* | 1/2013 | Crary | F01N 3/2066 137/565.17 |
| 2013/0192207 A1* | 8/2013 | Chiba | F01N 3/208 60/274 |

FOREIGN PATENT DOCUMENTS

| | | |
|---|---|---|
| DE | 102006061732 A1 | 7/2008 |
| DE | 10 2007 017 459 A1 | 10/2008 |
| DE | 10 2008 009 650 A1 | 8/2009 |
| DE | 10 2008 000 594 A1 | 9/2009 |
| DE | 102010033038 A1 | 2/2012 |
| JP | 2010024896 A | 2/2010 |
| KR | 20120076353 A | 7/2012 |
| WO | 9608639 A1 | 3/1996 |
| WO | WO2012053265 * | 4/2012 |

* cited by examiner

METHOD FOR EMPTYING A DEVICE FOR PROVIDING A LIQUID ADDITIVE

BACKGROUND OF THE INVENTION

Field of the Invention

The invention relates to a method for operating a device for providing liquid additive. Devices for providing liquid additive are used for example in the case of motor vehicles in order to feed a liquid additive, such as for example fuel and/or urea-water solution, to exhaust aftertreatment devices.

Exhaust treatment devices to which a liquid additive is fed are used in particular in the case of motor vehicles with diesel engines. In the case of diesel engines, exhaust treatment devices or exhaust treatment processes in which nitrogen oxide compounds in the exhaust gas are reduced with the aid of a liquid additive are typically used for cleaning the exhaust gases. Such an exhaust treatment process is for example the process of selective catalytic reduction (SCR). For this process, a reducing agent or a reducing agent precursor is used as the liquid additive. Used particularly frequently as the liquid additive is a urea-water solution, which for the purpose of the process of selective catalytic reduction for example is obtainable with a urea content of 32.5% under the trade name AdBlue®.

It is a critical factor in the structural design of devices for providing liquid additive that the liquid, water-based, additives can freeze at low temperatures. The described urea-water solution AdBlue® for example freezes at −11° C. Such low temperatures may occur in motor vehicles, in particular when they are at a standstill for a long time. The freezing of the liquid additive causes an increase in the volume of the liquid additive. This increase in volume may lead to a considerable increase in pressure in the system, and there is therefore the risk of certain components of the device being damaged or even destroyed.

To avoid the problems associated with the increase in volume when the liquid additive freezes, it is known to drain the devices after stopping the operation of an internal combustion engine. Once draining has taken place, there is no liquid additive in the device and damage due to frozen liquid additive cannot occur. However, this has the effect that the system has to be completely "filled" again before renewed, exact metering can be performed.

It is also problematic in the case of devices for providing liquid additive that these additives often tend to form crystalline precipitates. These precipitates may occur at certain temperatures and/or after long standstill times. The urea-water solution described further above for example forms crystalline precipitates of urea in the form of hard particles. These particles may damage movable parts of the device, because they exert their abrasive effect there.

BRIEF SUMMARY OF THE INVENTION

On this basis, it is an object of the present invention to solve, or at least mitigate, the technical problems described in connection with the prior art. In particular, it is intended to present a particularly advantageous method for operating a device for providing liquid additive. In particular, technically simple protection from damage, a long service life of the device and/or exact metering of the additive, such as a urea-water solution, to the exhaust system of a motor vehicle are the main concerns here.

These objects are achieved by the method according to the features recited below. Further advantageous refinements of the method are specified in the dependently drafted patent claims. The features individually recited in the patent claims can be combined with one another in any desired, technically meaningful way, and can be supplemented by explanatory matter from the description, thereby presenting further implementational variants of the invention.

The invention relates to a method for operating a device for providing a liquid additive, comprising a feeding path along which the liquid additive is fed, the feeding path having at least one first portion, in which there is arranged a peristaltic pump, which can be damaged by deposits precipitated from the liquid additive, and the feeding path also having at least one second portion, in which a component susceptible to freezing is arranged. The method comprises at least the following steps:

a) feeding liquid additive along the feeding path of the device;
b) stopping the feeding of liquid additive;
c) partially draining the feeding path, liquid additive remaining in the at least one first portion of the feeding path while the at least one second portion is being drained.

The liquid additive is preferably a urea-water solution. A feeding path is intended in particular to mean a flow path extending from an intake port in a tank to a dispensing port for the liquid additive at an exhaust treatment device. The feeding path is at least predominantly formed by a line and/or a channel through which the liquid additive is fed.

The liquid additive is stored in the tank. The intake port is preferably formed in the vicinity of the bottom of the tank in order that the liquid additive stored in the tank can be removed from the tank as completely as possible. The dispensing port at the exhaust treatment device preferably has at least one injector and/or a nozzle and/or a (passive) valve. With a nozzle, the liquid additive can be fed to the exhaust treatment device in a preferably finely atomized manner (possibly by means of compressed air). An injector makes metering of the liquid additive possible. Metering is performed in a target-oriented manner, for example by fixing the opening time of the injector.

Preferably arranged on or in the feeding path is a feeding means by which the feeding of the liquid additive takes place. The feeding means is preferably at least one pump. A piston pump, a diaphragm pump or a positive-displacement pump may be used for example as the feeding means. The feeding means is set up for feeding the liquid additive from the intake port along the feeding path with a corresponding feeding direction to the dispensing port.

The first portion and the second portion are regions of the feeding path that are arranged one behind the other (possibly directly) in the feeding direction of the liquid additive through the feeding path from the tank to the dispensing port. The feeding path may have a number of first portions and/or a number of second portions. At least one first portion is preferably arranged directly downstream of the intake port. Following thereafter (possibly directly) in the feeding direction there is preferably at least one second portion.

The component that is susceptible to freezing is an (in particular electronic and/or movable) component which has in particular the characteristic that it can be damaged by an increase in volume when the liquid additive—located nearby—freezes. Such a component is for example a susceptible sensor element, such as for example a pressure sensor. A pressure sensor typically measures a change in pressure by way of a deformation of a movable pressure pick-up element. The strong increase in volume when freezing takes place may therefore cause such a pressure sensor to be damaged very easily, because a maximum permissible expansion is exceeded. The component that is susceptible to freezing may also be a valve that is not designed for the loads occurring when freezing takes place.

A peristaltic pump is also referred to hereinafter as an operating component. A peristaltic pump or an operating component is a component of the device that is in contact with the liquid additive or is flowed through by the additive. The peristaltic pump actively realizes a feeding of the additive and/or active compensation for movements of the additive in the device. A peristaltic pump or an operating component includes in particular components that themselves move within or alongside the lines for the additive. These components may for example have sealing surfaces that are acted upon by liquid additive. The impending damage from precipitated deposits may take place here for example due to an abrasive working of sealing surfaces, a blockage of closing arrangements, an agglomeration of deposits, etc. The peristaltic pump is designed in particular in such a way that it can realize a reversible feeding direction, that is to say it can feed additive in two opposite directions in the prescribed manner.

A peristaltic pump is a positive displacement pump in which the additive to be fed is forced through a flexible line (such as a tube) for example by external mechanical deformation.

The feeding of liquid additive along the feeding path in step a) corresponds to normal operation of a device for providing the liquid additive. In step a), the liquid additive is for example fed to an exhaust treatment device. During step a), a motor vehicle in which the described device is installed is operated in a regular manner. This means that the internal combustion engine of the motor vehicle is running and exhaust gases of the internal combustion engine are cleaned in the exhaust treatment device.

The stopping of the feeding in step b) corresponds to a usual operational stop of the feeding. Such a usual operational stop typically takes place in parallel with operational stopping of the motor vehicle, in which the internal combustion engine and the exhaust treatment device of the motor vehicle are also deactivated or stopped.

In step c), the feeding path is partially drained, second portions being drained and liquid additive remaining in first portions. It is in this way possible to avoid liquid additive being present on components that are susceptible to freezing along the feeding path. Components of the device that are susceptible to freezing are preferably only arranged at second portions, which are drained in step c). Apart from the peristaltic pump, there may exist other operating components that can be damaged by deposits precipitated from the liquid additive, which are arranged in first portions, and which are not drained in step c). In particular, further pumps and/or a number of peristaltic pumps may also be arranged in first portions of the feeding path of the device.

The described method is based on the realization that especially in the case of devices that are drained during an operational stop, damage often occurs in particular due to abrasively acting precipitates from the liquid additive. It has been found that such deposits are formed in particular when the device for providing liquid additive has been drained and remaining drops of the liquid additive then evaporate. If the liquid additive is a urea-water solution and it evaporates, crystalline urea particles (such as for example biuret) are left behind and form the precipitates or deposits described. The risk of the formation of deposits is much lower in regions of the feeding path that are completely filled with liquid additive. One reason is that there is less evaporation in such regions. Another reason is that, because of the greater amount of water present, in such regions there is also the possibility that the evaporation only causes an increase in the concentration of the urea content in the solution, without precipitates actually being formed. The risk of the formation of crystalline precipitates in first portions of the feeding path with components that are particularly sensitive to deposits can be effectively avoided or reduced by these first portions not been drained. In these first portions, the liquid additive remains even after step c). The draining preferably only takes place partially in step c), and in such a specifically directed manner that liquid additive remains in first portions, while second portions are drained.

In order that the effect produced in step c) that the liquid additive is distributed to first portions and the liquid additive is removed from the second portions during a lengthy standstill phase of the device is maintained as desired, the device is preferably designed in such a way that at least one of the following effects ensures that the liquid additive located in the at least one first portion cannot be displaced: capillary forces, surface tension effects of the additive and hydrostatic forces. This means in particular that at least one of the effects acts in the system in such a way that only the second portions are filled with additive and only the first portions remain filled with gas/air, without operating a pump and/or displacements of the system of lines.

The method is particularly advantageous when the feeding of the liquid additive along the feeding path in step a) takes place with a feeding direction, and the draining in step c) takes place at least predominantly counter to the feeding direction.

It is preferred here that a feeding direction of a pump (in particular the peristaltic pump) for the feeding of the liquid additive is reversed for the draining of the feeding path according to step c).

In order to carry out the draining counter to the feeding direction, a feeding means (in particular a pump or peristaltic pump—also jointly referred to hereinbelow as "pump") that can feed both in the feeding direction and in the reverse direction is provided. Liquid additive is then typically forced back into the tank through the intake port at the tank. On the opposite side, that is to say at a dispensing port, gas or air is then taken in. From here, the feeding path is then filled with air or gas, which replaces the liquid additive. By a reversal of the pump, the additive is therefore pumped with a return feeding direction, which is directed counter to the feeding direction. It is possible that each fraction of the additive fed back is fed exclusively to the intake port, but it may also be provided that for example at least one (branching) storage volume, into which a (small) fraction of the fed-back additive flows during step c), is provided on the feeding path. For the last-mentioned case it should nevertheless apply that the "predominant fraction" of the fed-back additive is removed from the feeding path counter to the feeding direction.

Such a reversal of the feeding direction of a pump is a technically particularly simple variant for realizing a reversible feeding direction in a device. A pump with a reversible feeding direction is for example a peristaltic pump. In the case of a peristaltic pump, a portion of the feeding path is deformed in the manner of a peristaltic movement in order to move the liquid additive in the feeding direction. Such a pump preferably has a rotary drive, which drives the peristaltic movement by way of a movable pump element. The movable pump element may for example be an eccentric.

Such a pump is preferably designed such that a reversal of the feeding direction is possible by a reversal of the driving direction of the drive.

According to a further configurational variant, it is also possible that a device for providing liquid additive has two (possibly different) feeding means, a first feeding means being set up for feeding liquid additive during regular operation (step a)) and a further feeding means being set up for draining the feeding path counter to the feeding direction. The two feeding means may be arranged in series or parallel to one another along the feeding path in parallel regions of the feeding path.

Following a further implementational variant of the method, it is also possible that the device for providing the liquid additive has a return line, which branches off from the feeding path and leads back into a tank. The draining of the feeding path may also take place through the return line.

It has been found that pumps for feeding liquid additive can be easily damaged in particular by precipitated deposits from the liquid additive. The reason for this is that a pump has moving parts and the precipitates, as abrasively acting particles, can therefore produce an abrasion on the pump that damages the pump. The effects of precipitated deposits are particularly great in the case of peristaltic pumps. In the case of a peristaltic pump, surfaces of the feeding path are typically pressed against one another or rubbed against one another. Therefore, in the case of peristaltic pumps, the deposits are in particularly intensive abrasive contact with the moving parts of the pump.

On the other hand, peristaltic pumps make it possible for the feeding path to be drained particularly easily, by reversing the driving direction of the pump. Therefore, a particularly advantageous synergy effect can be achieved if the described method is used in the case of a device with a peristaltic pump, because on the one hand draining of the feeding path can be achieved particularly easily, and on the other hand particularly good protection of the peristaltic pump from deposits is made possible when the feeding path is only partially drained in accordance with the method described.

The method is also advantageous when a pump is operated for a predetermined time interval for the partial draining of the feeding path in step c), the time interval being chosen such that liquid additive remains in the at least one first portion.

The draining of the feeding path requires a time period that is dependent on the structure of the device but is easy to determine. This time period is dependent in particular on the length of the feeding path and the (backward) feeding rate of the liquid additive in the feeding path. By operating a pump for draining the feeding path for a time interval that is shorter than the time period that is necessary to drain the feeding path completely, it can be ensured that partially liquid additive remains in the feeding path. In the case of the method for draining the feeding path (with a single pump), it should be ensured that during the draining the liquid additive is first removed from the second portion, in order that there is still liquid additive in the first portion when the draining is stopped after the time interval, while the second portion has already been drained completely. The implementational variant of the method is therefore advantageous in particular whenever the at least one first portion lies upstream of the at least one second portion in the feeding direction from the intake port to the dispensing port.

The invention is also advantageous when the partial draining of the feeding path in step c) is monitored by at least one sensor element, the sensor element being arranged at a point of the feeding path and being set up for detecting whether there is liquid additive at the point, and the draining also being stopped as soon as there is no longer any liquid additive at the point.

The sensor element may for example consist of two electrical pins, between which there is an electrically conductive connection as long as liquid additive is in contact with the pins. When the liquid additive is no longer in contact with the pins, the electrical connection is broken and it can be detected that there is no longer liquid additive at the point. Such a sensor element for detecting whether or not liquid additive is present is particularly advantageous whenever timing control alone is not sufficient for monitoring step c) on account of uncertainties with respect to the feeding rate for the liquid additive during draining. Even if the sensor element can in principle be provided for likewise undertaking other monitoring functions, a separate sensor element (of a technically simple construction) that is only provided for the aforementioned purpose may alternatively be used.

It is also advantageous when the sensor element is a pressure sensor and the pressure measured by the pressure sensor changes in dependence on the degree of filling of the feeding path.

In the case of this variant it is possible to detect by way of the pressure to what extent the feeding path has already been drained during step c), in order to stop the draining as soon as the at least one second portion has been drained and when there is still liquid additive in the at least one first portion.

A dependence between the pressure at the pressure sensor and the degree of filling of the feeding path may exist for example because of the hydrostatic pressure of the liquid additive in the feeding path. Thus, the hydrostatic pressure is all the greater the more liquid additive is present in the feeding path. A pressure sensor is normally provided in a device for providing liquid additive in order to monitor and/or control the regular operation of the device during the provision of the liquid additive (step a)). It is particularly advantageous when this pressure sensor is additionally used in step c) for monitoring the extent to which the feeding path has already been drained. Then, no additional components are necessary for the monitoring of step c).

The method is also advantageous when a pump is used for the partial draining of the feeding path in step c), an operating parameter of the pump changing in dependence on a degree of filling of the feeding path with liquid additive and draining operation of the pump being stopped when a predetermined value of the operating parameter is reached.

Such an operating parameter may for example be a response of the pump to an applied operating current. For example, a movable pump element reacts more quickly with a movement in response to an applied operating current when the amount of liquid additive in the feeding path is less. This may be the case because the amount of liquid additive to be moved by the pump has in this case already been reduced. The monitoring of the degree of filling of the feeding path on the basis of an operating parameter of a pump makes it possible to dispense with additional components for monitoring the draining in step c).

The method is also advantageous when the pump is set to a diagnostic mode at at least one predetermined point in time during the draining, the operating parameter of the pump that is dependent on the degree of filling of the feeding path being determined during the diagnostic mode.

A diagnostic mode is intended to mean a special operating mode of the device that is only activated in order to monitor the degree of filling of the feeding path. The diagnostic mode may for example comprise a special pump pulse, which is generated by a predetermined or defined diagnostic driving current of the pump. Thus, better comparability of the operating parameter can be ensured, in order that the determination of the degree of filling of the feeding path is particularly accurate.

It is also possible that a degree of filling of the feeding path is determined on the basis of a pressure and/or a change in pressure, which is measured by a pressure sensor and which occurs when the pump exerts a pump pulse. This pump pulse may be a normal pulse (such as during the normal operation of the pump when draining) and/or a special pump pulse (corresponding to a special diagnostic mode for monitoring the degree of filling).

The method is also advantageous when, for the partial draining of the feeding path in step c), the feeding path is first drained completely and the feeding path is subsequently partially filled again with liquid additive, so that there is liquid additive in the at least one first portion.

In the case of this operating mode, it is preferably initially not monitored whether or not the feeding path is only partially drained. It is consequently always ensured that complete draining of the feeding path has taken place. This may occur for example by a pump for draining the feeding path being operated for a time interval that is sufficiently long in order to ensure complete draining of the feeding path in every case. Subsequently (that is to say in particular immediately subsequently and/or without ending the "operational stop") (only) a partial refilling of the feeding path is carried out. In this case, the feeding path is not completely filled again. Such partial refilling may be monitored by all of the methods described further above that are also suitable for monitoring the draining.

Conducting the method in such a two-staged manner, in which complete draining first takes place and then only partial filling again, may be advantageous because the amount that is removed from the feeding path during the draining is typically much greater than the amount that is fed into the feeding path again during the refilling. It is therefore considerably easier to carry out the refilling precisely in such a way that liquid additive remains in the first portion, while the second portion has been drained completely.

According to a further embodiment of the described method, it is preferred that in step c) the partial refilling after complete draining of the feeding path takes place by way of the return line. By conducting the method in this way, it is also made possible that first portions of the feeding path that lie downstream in the feeding direction of second portions that are to remain drained are filled again with liquid additive. When the feeding path is first drained completely in step c), it may subsequently be filled through the dispensing port with gas or air and the return line filled with liquid additive in an alternating and specifically directed manner. This alternating filling may take place such that, after step c), in first portions there is liquid additive, which has entered the feeding path through the return line, while in second portions there is gas or air, which has entered the feeding path through the dispensing port. During the described specifically directed filling of the feeding channel, a feed pump may also reverse its feeding direction. Thus, intended amounts of the liquid additive can also be fed in a specifically directed manner into the portions of the feeding path between the return line and the dispensing port.

The method is also advantageous when the feeding path has at least one siphon, the at least one first portion being arranged in the siphon.

Such a siphon is characterized in particular by a U-shaped design of the feeding path. This produces a lower region of the feeding path, which is respectively alongside two raised regions of the feeding path. The raised regions are arranged higher with respect to their geodetic position than the lower region. In such a siphon, a residual amount of the liquid additive typically collects as a result of gravitational force when the feeding path has been partially drained. The first portion is preferably arranged in such a siphon. By including a siphon in the structural design, it can be ensured that the amount of liquid additive present in the feeding path remains in the first portion even when there are external influences. Such external influences are for example if the device is moved, tipped and/or displaced in the partially drained filling state, and if vibrations act on the device.

A siphon is therefore a particularly reliable possibility for maintaining the partial draining of the feeding path in the desired form with drained second portions and a filled first portion even during long standstill times of a motor vehicle. The integration of at least one siphon in the feeding path may expressly be combined with all of the described measures for producing a distribution of the liquid additive in the feeding path with filled first portions and drained second portions. It is also possible that only the described siphon is provided for maintaining said distribution, and no deliberate (additional or active) method steps for producing the distribution are carried out in step c).

The invention is used in particular in the case of a device for providing a liquid additive, comprising a feeding path along which liquid additive is fed, the feeding path having at least one first portion, in which there is arranged a peristaltic pump, which can be damaged by deposits precipitated from the liquid additive, and a second portion, in which at least one component susceptible to freezing is arranged, the device being set up for carrying out at least one variant described here of the method described above. This device may have all of the device features described further above in connection with the described method.

It is also intended to provide a motor vehicle, having an internal combustion engine and an exhaust treatment device for cleaning the exhaust gases of the internal combustion engine. Preferably arranged at the exhaust treatment device is a dispensing port, by way of which a liquid additive can be fed by the described device to the exhaust treatment device. The dispensing port may have the special features described further above. Preferably provided in the exhaust treatment device is an SCR catalytic converter, with which the process for selective catalytic reduction can be carried out for cleaning the exhaust gas. A liquid additive for carrying out the SCR process can be fed to the exhaust treatment device by way of a dispensing port. Thus, for example, an injector at the dispensing port of the described device is supplied with liquid additive from a tank. The described device may preferably be operated by a described method, the carrying out of the method with the device taking place with the aid of a control device in which the method steps or method sequences required for carrying out the method are stored. The control device may for example be a component part of the engine control of the motor vehicle.

BRIEF DESCRIPTION OF THE SEVERAL VIEWS OF THE DRAWING

The invention and the technical environment are explained in more detail below on the basis of the figures. The figures show particularly preferred exemplary embodiments, to which the invention is not restricted however. In particular, it should be pointed out that the figures, and in particular the relative sizes represented, are only schematic. In the drawing.

DESCRIPTION OF THE INVENTION

Figure 1:
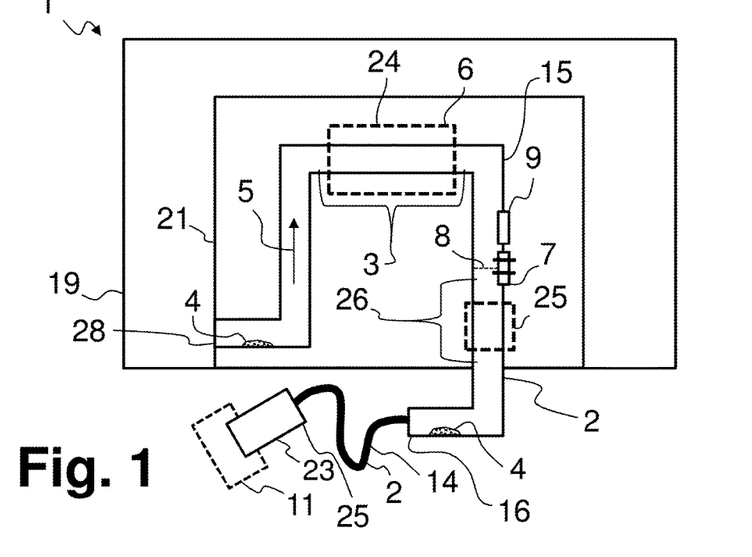
FIG. 1: shows a device for carrying out the described method.
Figure 2:
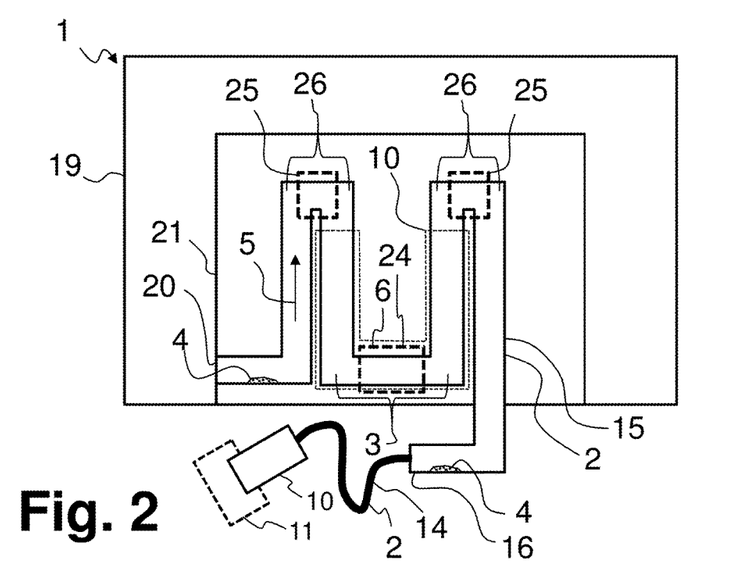
FIG. 2: shows a further variant of a device for carrying out the described method.

In FIGS. 1 and 2, a device 1 for providing a liquid additive (here a urea-water solution in particular) is respectively shown. This device 1 has in each case a tank 19, in which the liquid additive can be stored. Attached to the tank 19 there is in each case a housing 21, arranged in which are the peristaltic pump 24 and possibly further operating components of the device 1 with which the feeding of liquid additive takes place and which can be damaged by deposits precipitated from the liquid additive. The feeding of the liquid additive takes place at an intake port 28 from the tank 19 with the feeding direction 5 along a feeding path 2 to a dispensing port 23. At the dispensing port 23, the liquid additive can be fed to an exhaust treatment device 11. Deposits 4 that are presented by way of example, and here are crystalline precipitates from the liquid additive, may form in the feeding path 2.

The feeding path 2 is typically formed partly by a feeding channel 15 and partly by a supply line 14. Here, a region of the feeding path 2 within the housing 21 is referred to as the feeding channel 15. Arranged on the feeding path 2 in the region of the feeding channel 15 are the peristaltic pump 24 and possibly further operating components that can be damaged by deposits precipitated from the liquid additive. Here, a region of the feeding path 2 outside the housing 21 that is typically formed by a flexible line is referred to as the supply line 14. The supply line 14 typically adjoins the feeding channel 15 and represents a connecting line between the dispensing port 23 and the housing 21 of the device 1. The exhaust treatment device 11 is typically at a distance from the tank 19 or the housing 21, and this distance can be spanned by the supply line 14. The supply line 14 may be connected to the feeding channel 15 at a connection 16.

The feeding path 2 has first portions 3, in which there are arranged at least one peristaltic pump 24 and possibly further operating components which can be damaged by deposits 4 that are precipitated from the liquid additive. The feeding path 2 additionally has second portions 26, arranged in which are components that are susceptible to freezing 25, which can be damaged by frozen liquid additive and the increase in volume of the freezing liquid additive. Such components that are susceptible to freezing 25 are for example sensors and/or also an injector, which is arranged at the dispensing port 23.

In order to monitor the degree of filling of the feeding path 2, at a point 8 of the feeding path 2 there is arranged by way of example in FIG. 1 a sensor element 7, which has two electrically conductive pins, by which a conductivity of the liquid additive in the feeding path 2 can be monitored. If there is liquid additive at the point 8, the electrical connection between the pins of the sensor 7 is closed, while the electrical connection is broken if there is no liquid additive at the point 8. Also shown in FIG. 1 is a pressure sensor 9, by which the degree of filling of the feeding path 2 can be monitored.

FIG. 2 shows by way of example a refinement of a device 1 with a siphon 10, in which liquid additive collects when the feeding path 2 has been partially drained. According to this configurational variant of a device, the at least one first portion 3 is preferably arranged in the region of the siphon 10. The at least one second portion 26 is preferably arranged outside or above the siphon.

Figure 3:
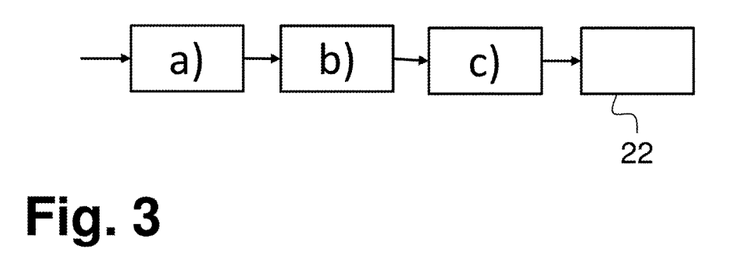
FIG. 3: shows a flow diagram of the described method.

FIG. 3 shows a flow diagram of the described method for operating a device for providing liquid additive. Method steps a), b) and c) can be seen, a) concerning regular operation of the device. In step b), the device is stopped and, in step c), a partial draining of the feeding path of the device takes place. The evaporation phase 22, which follows on from the partial draining of the feeding path in step c), can also be seen. During the evaporation phase 22, droplets of the liquid additive in the drained regions of the feeding path evaporate. As a result, precipitates, and consequently deposits, can form in the feeding path.

Figure 4:
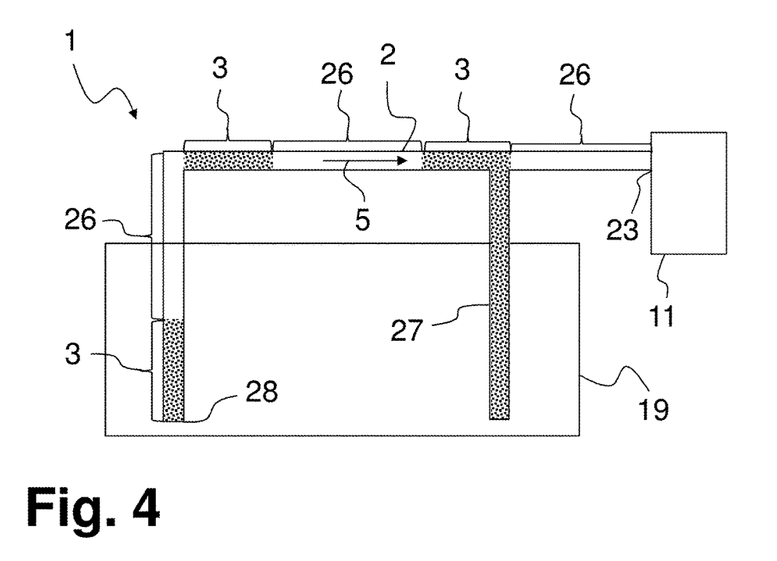
FIG. 4: shows yet a further variant of a device for carrying out the described method.

FIG. 4 shows yet a further configurational variant of a device 1 for carrying out the described method. This device 1 also has a feeding path 2, which extends from an intake port 28 at a tank 19 with a feeding direction 5 toward a dispensing port 23 at an exhaust treatment device 11. From the feeding path 2 there branches off a return line 27, which is likewise connected to the tank 19. When the feeding path 2 of this device 1 is first drained completely step c), the feeding path 2 can be subsequently filled again in step c) alternately with liquid additive by way of the return line 27 and with gas or air by way of the dispensing port 23. It can thus be achieved in a specifically directed manner that there is liquid additive in first portions 3, while there is no liquid additive in second portions 26.

Figure 5:
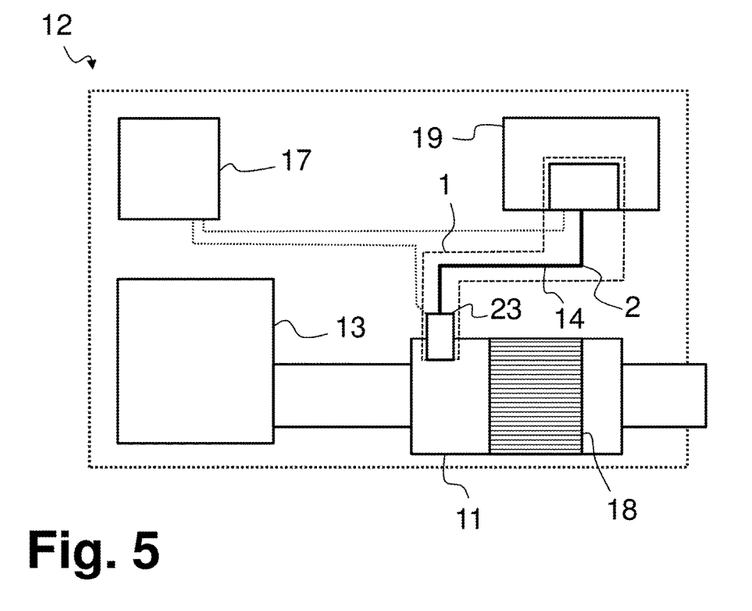
FIG. 5: shows a motor vehicle with a device for carrying out the described method.

FIG. 5 shows a motor vehicle 12 comprising an internal combustion engine 13 and an exhaust treatment device 11 for cleaning the exhaust gases of the internal combustion engine 13. The exhaust treatment device 11 preferably has an SCR catalytic converter 18 with which the process of selective catalytic reduction can be carried out for cleaning the exhaust gas. Liquid additive can be fed by a device 1 from a tank 19 to the exhaust treatment device 11 at a dispensing port 23. At the dispensing port 23, preferably an injector and/or a nozzle is/are arranged. The tank 19 and the dispensing port 23 are connected to a supply line 14 which partially forms a feeding path 2 for the liquid additive. The device 1 is connected to a control device 17, which coordinates the carrying out of the described method. The control device 17 may be a component part of a engine control of the motor vehicle 12.

LIST OF DESIGNATIONS

1 Device
2 Feeding path
3 First portion
4 Deposit
5 Feeding direction
6 Pump
7 Sensor element
8 Point
9 Pressure sensor
10 Siphon
11 Exhaust treatment device
12 Motor vehicle
13 Internal combustion engine 14 Supply line
15 Feeding channel
16 Connection
17 Control device
18 SCR catalytic converter
19 Tank
20 Intake port
21 Housing
22 Evaporation phase
23 Dispensing port
24 Peristaltic pump
25 Component susceptible to freezing
26 Second portion
27 Return line

The invention claimed is:

1. A method for operating a device for providing a liquid additive, the method comprising the following steps:
    providing a liquid additive feeding path including at least one first portion having a peristaltic pump able to be damaged by deposits precipitated from the liquid additive and including at least one second portion having a component susceptible to freezing disposed downstream in a dispensing direction of the feeding path to a dispensing port;
    placing at least one sensor element at a point of the feeding path between the peristaltic pump and the component susceptible to freezing;
    a) feeding liquid additive along the feeding path of the device;
    b) stopping the feeding of liquid additive; and
    c) partially draining the feeding path by maintaining liquid additive in the at least one first portion while draining the at least one second portion;
    monitoring the partial draining of the feeding path in step c) by using the at least one sensor element;
    detecting if there is liquid additive at the point by using the at least one sensor element; and
    stopping the draining as soon as there is no longer any liquid additive at the point.

2. The method according to claim 1, which further comprises:
    carrying out the feeding of the liquid additive along the feeding path in step a) in a feeding direction; and
    carrying out the draining in step c) at least predominantly counter to the feeding direction.

3. The method according to claim 2, which further comprises feeding the liquid additive in the feeding direction by using the pump and reversing the feeding direction by using the pump for draining the feeding path in step c).

4. The method according to claim 1, which further comprises providing the sensor element as a pressure sensor measuring a pressure changing in dependence on a degree of filling of the feeding path.

5. The method according to claim 1, which further comprises:
    carrying out the partial draining of the feeding path in step c) by using the pump;
    changing an operating parameter of the pump in dependence on a degree of filling of the feeding path with liquid additive; and
    stopping the draining being carried out by the pump upon reaching a predetermined value of the operating parameter.

6. The method according to claim 5, which further comprises setting the pump to a diagnostic mode at least at one predetermined point in time during the draining, and determining the operating parameter of the pump, being dependent on the degree of filling of the feeding path, during the diagnostic mode.

7. The method according to claim 1, which further comprises providing the feeding path with at least one siphon in which the at least one first portion is disposed.

8. A method for operating a device for providing a liquid additive, the method comprising the following steps:
    providing a liquid additive feeding path including at least one first portion having a peristaltic pump able to be damaged by deposits precipitated from the liquid additive and including at least one second portion having a component susceptible to freezing;
    a) feeding liquid additive along the feeding path of the device;
    b) stopping the feeding of liquid additive; and
    c) partially draining the feeding path by maintaining liquid additive in the at least one first portion while draining the at least one second portion; and
    carrying out the partial draining of the feeding path in step c) by first completely draining the feeding path and subsequently partially filling the feeding path with liquid additive again to place liquid additive in the at least one first portion.

9. A device for providing a liquid additive, the device comprising:
    a feeding path for feeding the liquid additive along said feeding path, said feeding path having at least one first portion and at least one second portion;
    a peristaltic pump disposed in said at least one first portion and being able to be damaged by deposits precipitated from the liquid additive;
    at least one component susceptible to freezing being disposed in said at least one second portion disposed downstream in a dispensing direction of said feeding path to a dispensing port;
    at least one sensor element at a point of said feeding path between said peristaltic pump and said at least one component susceptible to freezing; and
    a controller being programmed to:
        a) feed liquid additive along said feeding path;
        b) stop said feeding of liquid additive; and
        c) partially drain said feeding path by maintaining liquid additive in said at least one first portion while draining said at least one second portion;
    monitoring the partial draining of the feeding path in step c) by using said at least one sensor element;
    detecting if there is liquid additive at said point by using said at least one sensor element; and
    stopping the draining as soon as there is no longer any liquid additive at said point.

* * * * *